United States Patent
Li et al.

(10) Patent No.: US 12,519,404 B2
(45) Date of Patent: Jan. 6, 2026

(54) CONTROL OF MOTOR SOFT STARTER USING POWER ELECTRONIC SWITCHING DEVICES

(71) Applicant: EATON INTELLIGENT POWER LIMITED, Dublin (IE)

(72) Inventors: Jin Li, Medina, WI (US); Xin Zhou, Wexford, PA (US); Steven A. Dimino, Wauwatosa, WI (US); Kaijam Maurice Woodley, Brown Deer, WI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 187 days.

(21) Appl. No.: 18/276,740

(22) PCT Filed: Feb. 10, 2022

(86) PCT No.: PCT/EP2022/025048
§ 371 (c)(1),
(2) Date: Aug. 10, 2023

(87) PCT Pub. No.: WO2022/171365
PCT Pub. Date: Aug. 18, 2022

(65) Prior Publication Data
US 2024/0136961 A1 Apr. 25, 2024
US 2024/0235441 A9 Jul. 11, 2024

Related U.S. Application Data

(60) Provisional application No. 63/147,794, filed on Feb. 10, 2021.

(51) Int. Cl.
*H02P 1/28* (2006.01)
*H01H 9/56* (2006.01)
(Continued)

(52) U.S. Cl.
CPC .............. *H02P 6/20* (2013.01); *H01H 9/56* (2013.01); *H01H 2009/543* (2013.01)

(58) Field of Classification Search
CPC ... H02P 1/28; H02P 27/04; H02P 6/20; H01H 9/56; H01H 2009/543
See application file for complete search history.

(56) References Cited

U.S. PATENT DOCUMENTS 6,407,529 B1 6/2002 Gritter et al.
2011/0291596 A1 12/2011 Lu et al.
(Continued)

FOREIGN PATENT DOCUMENTS

| JP | 2006-057567 A | 3/2006 |
| JP | 2012-085475 A | 4/2012 |
| JP | 2018-170855 A | 11/2018 |

OTHER PUBLICATIONS

Japanese Patent Office "Notice of Reasons of Refusal" for corresponding Japanese Patent Application No. 2023-547295, dated Jul. 25, 2024 (mailed Jul. 31, 2024), includes foreign agent's English language translation.

(Continued)

*Primary Examiner* — Cortez M Cook
(74) *Attorney, Agent, or Firm* — Eckert Seamans Cherin & Mellott, LLC

(57) ABSTRACT

Systems and methods for soft starting a motor (40) using solid-state switching devices are disclosed. The system (10) includes a soft starting switch (53) that is made of a plurality of solid-state switches (62, 63). The system (10) also includes a controller (86) that is programmed to regulate currents and voltages delivered to the motor (40) during a start-up operation of the motor by cycling the solid-state switches (62, 63) ON and OFF during the start-up operation.

11 Claims, 7 Drawing Sheets

(51) Int. Cl.
*H02P 6/20* (2016.01)
*H01H 9/54* (2006.01)

(56) References Cited

U.S. PATENT DOCUMENTS

| | | | | |
|---|---|---|---|---|
| 2013/0020975 A1* | 1/2013 | Wolfe | ............. | H02P 1/28 |
| | | | | 318/430 |
| 2016/0172935 A1* | 6/2016 | Mountain | ............. | H02P 27/04 |
| | | | | 310/68 D |
| 2019/0089146 A1 | 3/2019 | Li et al. | | |

OTHER PUBLICATIONS

European Patent Office "International Search Report and Written Opinion" for corresponding International (PCT) Patent Application No. PCT/EP2022/025048, dated May 30, 2022, 9 pp.

\* cited by examiner

CONTROL OF MOTOR SOFT STARTER USING POWER ELECTRONIC SWITCHING DEVICES

CROSS REFERENCE TO RELATED APPLICATIONS

This patent application claims the priority benefit under 35 U.S.C. § 371 of International Patent Application No. PCT/EP2022/025048, filed Feb. 10, 2022, which claims priority to U.S. Provisional Application No. 63/147,794, filed Feb. 10, 2021, entitled "CONTROL OF MOTOR SOFT STARTER USING POWER ELECTRONIC SWITCHING DEVICES", the contents of each are incorporated by reference herein.

FIELD OF THE INVENTION

The disclosed concept relates generally to devices and methods for soft starting a motor, and in particular, to devices and methods that use power electronic switching devices for soft starting a motor.

BACKGROUND OF THE INVENTION

Motor soft starters are devices that control the delivery of voltage and current from an alternating current (AC) power source to an electric motor (such as an induction motor) when the motor is starting up. Soft starters are configured to limit the transient voltages and inrush current to the electric motor during start-up, resulting in a "soft" motor starting process with a controlled motor speed ramp-up profile. In operation, power from the AC source is passed through power electronic switching devices in the soft starter, such as a pair of anti-parallel or back-to-back solid-state switches in the form of thyristors or silicon controlled rectifiers (SCRs), to control the current flow and, in turn, the terminal voltages of the electric motor, which directly regulates the motor torque and speed.

When implementing a soft starting control topology in a solid-state circuit breaker based on wide bandgap switching devices such as a metal oxide field effect transistor (MOSFET), insulated gate bipolar transistor (IGBT) or junction field effect transistor (JFET), soft starting can cause electrical and thermal stress on the solid-state switching devices. To be able to tackle the energy required for soft-starting, specially-designed components and/or large numbers of solid-state components are required. This can make the soft starting device large, expensive, and impractical for many applications. In addition, if solid-state switching devices operate too quickly during motor start-up, thermal stress or even arc flashing can occur.

There is thus a need for methods and systems that can address the problems described above.

SUMMARY OF THE INVENTION

These needs, and others, are met by systems and methods that use solid-state switching devices for soft starting a motor. The system includes a soft starting switch that is made of a plurality of solid-state switches. The system also includes a controller that is programmed to regulate currents and voltages delivered to the motor during a start-up operation of the motor by cycling the solid-state switches ON and OFF during the start-up operation.

In accordance with one aspect of the disclosed concept, a method of soft starting a motor comprises providing a soft starting switch that is electrically connected between a power source and an alternating current (AC) motor, wherein the soft starting switch device comprises one or more phases, and each of the one or more phases comprises a power electronic switching device that comprises a plurality of solid-state switches electrically connected in series or in parallel with each other. The method further comprises cycling the solid-state switches ON and OFF by a controller during a start-up operation to regulate currents and voltages delivered to the AC motor during the start-up operation.

In accordance with another aspect of the disclosed concept, a system for soft starting a motor comprises a soft starting switch and a controller. The soft starting switch comprises: a line side for connecting to a power source and a load side for connecting to a motor, and a power electronic switching device that is positioned between the line side and the load side. The power electronic switching device comprises a plurality of solid-state switches electrically connected in series or in parallel with each other. The controller is configured to regulate currents and voltages delivered to the motor during a start-up operation of the motor by cycling the solid-state switches ON and OFF during the start-up operation.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
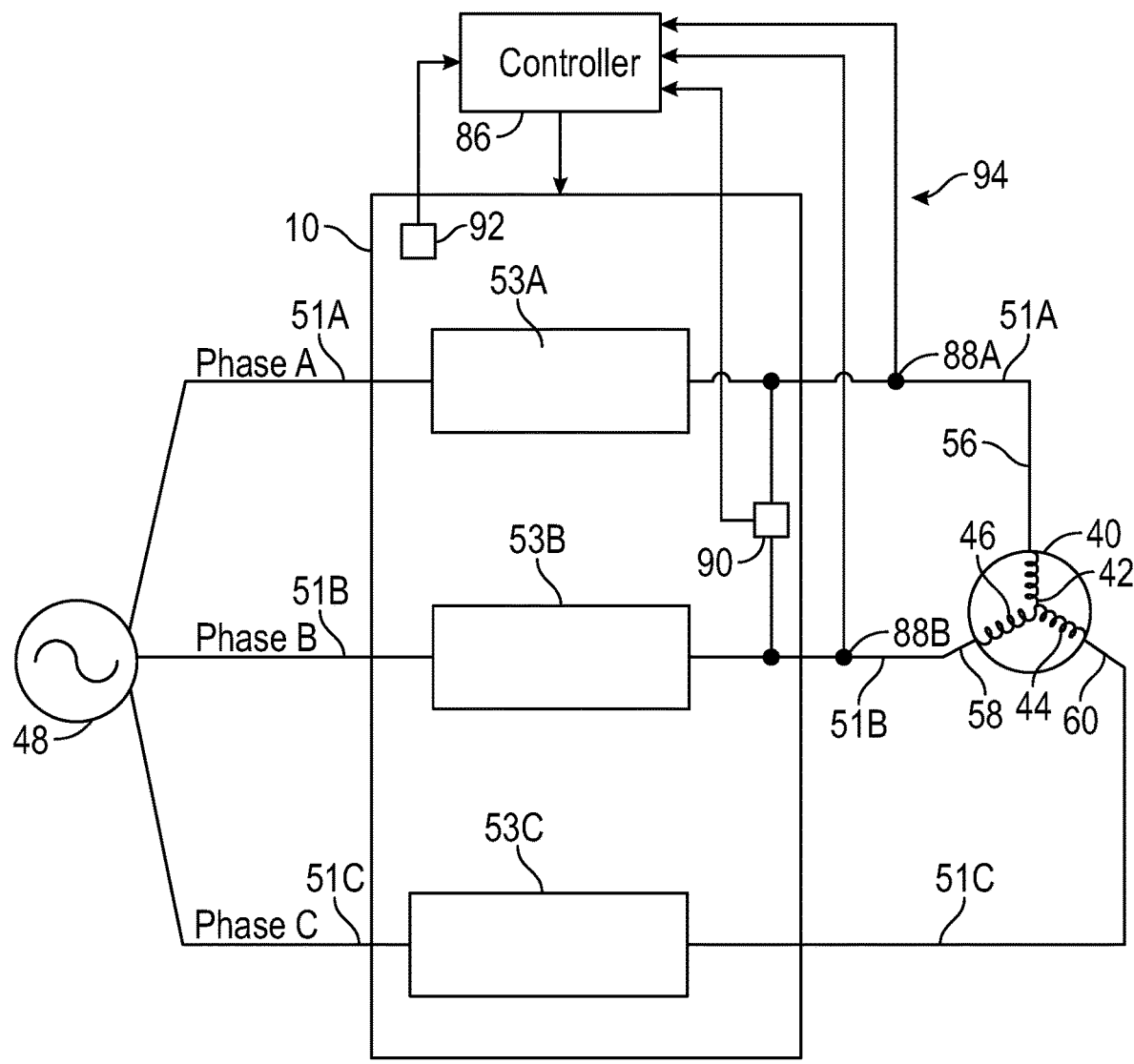
FIG. 1 illustrates an example circuit arrangement for starting and operating a three phase AC electric motor, in accordance with exemplary embodiments of the disclosed concept.

As used herein, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" (or "comprises") means "including (or includes), but not limited to."

When used in this document, the term "exemplary" is intended to mean "by way of example" and is not intended to indicate that a particular exemplary item is preferred or required.

As used herein, when terms such "first" and "second" are used to modify a noun, such use is simply intended to distinguish one item from another, and is not intended to require a sequential order unless specifically stated.

As used herein, the term "approximately," when used in connection with a numeric value, is intended to include values that are close to, but not exactly, the number. For example, in some embodiments, the term "approximately" can include values that are within +/−10 percent of the value.

As used herein, the term "memory" refers to a non-transitory device on which computer-readable data, programming instructions or both are stored. The term is intended to include single device embodiments, embodiments in which multiple memory devices together or collectively store a set of data or instructions, as well as individual sectors within such devices.

As used herein, term "processor" refers to a hardware component of an electronic device that is configured to execute programming instructions, such as a microprocessor or other logical circuit. A processor and memory can be elements of a microcontroller, custom configurable integrated circuit, programmable system-on-a-chip, or other electronic device that can be programmed to perform various functions. Except where specifically stated otherwise, the singular term "processor" is intended to include both single-processing device embodiments and embodiments in which multiple processing devices together or collectively perform a process.

As used herein, except where stated otherwise, the terms "low voltage" and "medium voltage" are intended to include all voltage ranges as may be known in the relevant technical field. For example, "low voltage" systems typically include electrical systems that are rated to handle voltages of 1000 V or less. "Medium voltage" (MV) systems typically include electrical systems that are rated to handle voltages from about 1000 V to about 38 kV. Some standards define MV as including the voltage range of 600 V to about 69 kV. (See NECA/NEMA 600-2003.) Other standards for medium voltages include ranges that have a lower end of 1 kV, 1.5 kV or 2.4 kV and an upper end of 35 kV, 38 kV, 65 kV or 69 kV. (See, for example, IEC 60038, ANSI/IEEE 1585-200 and IEEE Std. 1623-2004, which define MV as 1 kV-35 kV.) In such standards, the term "low voltage" would include all ranges under such levels.

As used herein, the terms "connected" and "electrically connected," when referring to two or more current-carrying components, each refer to a configuration in which the components can pass current between each other, either directly by a conductive mechanical connection, or indirectly via one or more conductive paths and/or intermediate electrical components.

FIG. 1 illustrates an example system for starting a three-phase AC electric motor 40. AC electric motor 40 is shown as having three stator windings 42, 44, 46, connected in a wye-arrangement. However, AC motor 40 can be connected in a delta arrangement without deviating from the scope of the invention. Stator windings 42, 44, 46 of AC motor 40 are operatively connected to corresponding phases of an AC power source 48 through corresponding conductors 51A, 51B, 51C at motor terminals 56, 58, 60. Each of the conductors 51A, 51B, 51C corresponds to one of the three phases of the power source 48. The phase sequence is not limited to the specific configuration shown, and other configurations can be used depending on the desired configuration and/or direction of rotation of the motor. In addition, it will be appreciated that a variable frequency drive such as a 12-pulse or 18-pulse transformer can be used with power source 48 as desired.

A soft starter 10 is connected between the AC power source 48 and the AC electric motor 40. In the example shown, the soft starter 10 is located outside the AC electric motor 40 (i.e., outside the wye). However, in various embodiments the soft starter 10 can be positioned inside the AC electric motor 40 (i.e., inside the wye) and can be a component of the motor itself, which can be considered to be an integrated (or modular) motor drive/soft starter application. Soft starter 10 is configured to limit the transient voltages and current to AC motor 40 during start-up, resulting in a "soft" motor starting.

The soft starter 10 includes set of soft starting switches 53A, 53B, 53C, one per phase, each of which is connected to one of the conductors 51A, 51B, 51C, and which by switching on or off will selectively permit or interrupt the flow of current through that conductor. For simplicity, this document may use reference number 51 to refer to one or more of the conductors, and it may use reference number 53 to refer to one or more of the soft starting switches. In addition, while FIG. 1 shows a three-phase circuit with a three-phase motor and three power electronic switching devices, in various embodiments the soft starter 10 can include a single-phase soft starting switch 53, connected to a single-phase motor in a single-phase circuit. In other embodiments, multi-phase circuits having more than three phases can be employed. In addition, in three-phase or other multi-phase applications, instead of separate soft starting switches the elements of each phase's soft starting switch can be incorporated into a single device.

The soft starting switches 53 include solid-state switching components, and can optionally also include power electronic switching components. The structure of the soft starting switches 53 is discussed herein below in the context of FIGS. 2A and 2B.

The soft starter 10 includes or is connected to a controller 86, which includes a processor and memory containing programming instructions configured to cause the processor to control operation of the solid-state switching components, or optionally both the solid-state and mechanical components, of the soft starting switches 53.

Figure 2A:
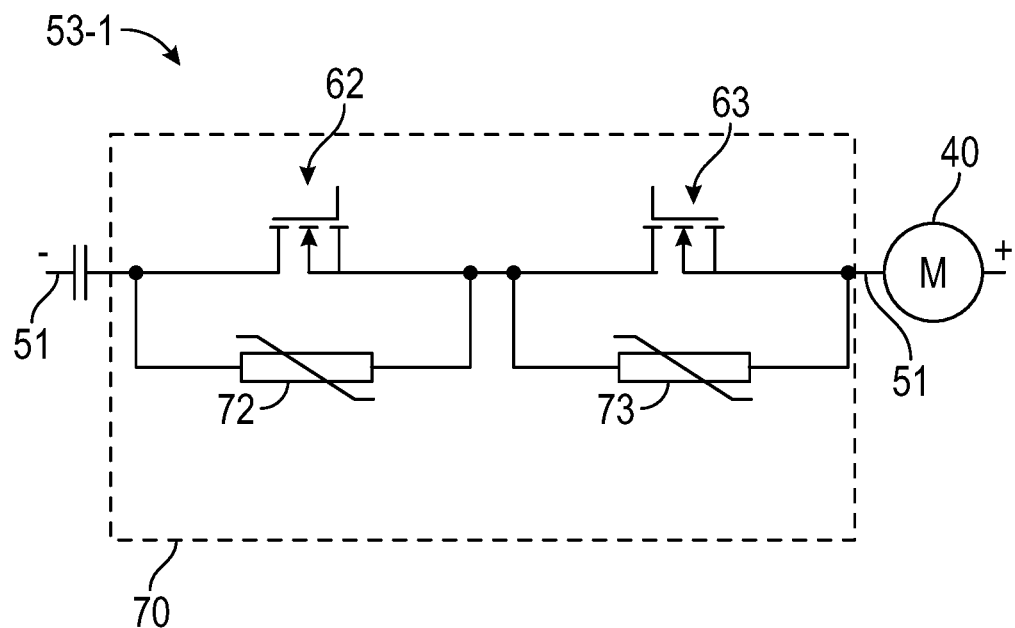
FIGS. 2A and 2B illustrate components of example switching devices that can be used in any of the phases of FIG. 1.
Figure 2B:
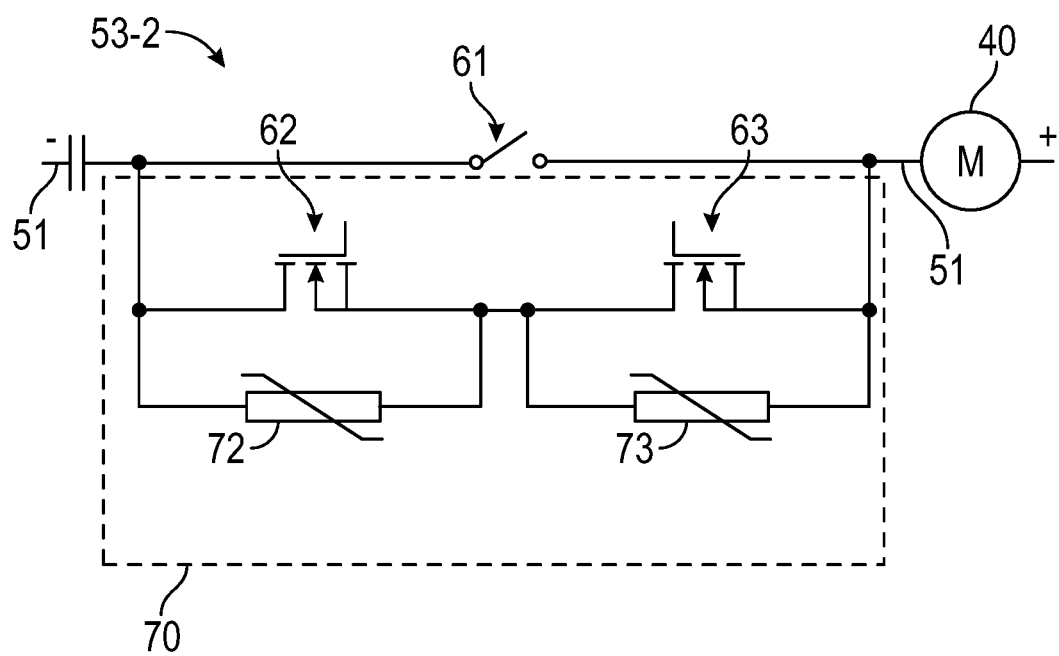

FIGS. 2A and 2B illustrate example components of a soft starting switch 53-1 or 53-2 that is positioned along a conductor 51 to control the flow of current through the conductor. The soft starting switch 53-1 or 53-2 includes a wide bandgap or other power electronic switching device 70 that includes one or more solid-state switches 62, 63. FIG. 2A illustrates a purely solid-state soft starting switches 53-1. FIG. 2B illustrates an embodiment that is a hybrid soft starting switches 53-2 with both solid-state and mechanical components. In the hybrid soft starting switches 53-2 of FIG. 2B, the mechanical switch 61 can be a vacuum interrupter, an air circuit breaker, or any other type of mechanically operated electrical switch that is capable of interrupting the flow of current along conductor 51. By way of example, the mechanical switch 61 can include a vacuum interrupter such as those disclosed in U.S. Pat. No. 10,796,867 to Li et al., the disclosure of which is fully incorporated into this document by reference. The mechanical switch 61 includes a line side that electrically connects to a power source 48 and a load side that electrically connects to the motor 40. The mechanical switch 61 also can include an actuator that, when triggered by the controller 86, creates a force to open or close the vacuum interrupter, air circuit breaker, or other electrical contact-containing components of the mechanical switch 61.

The power electronic switching device 70 includes at least a pair of solid-state switches 62, 63 that are electrically connected in series with each other, and in parallel with the mechanical switch 61, between the power source (not shown) and a load (one phase of motor 40). In wide bandgap power electronic switching devices, each of the solid-state switches 62, 63 can be a transistor such as a metal oxide field effect transistor (MOSFET), a gallium nitride (GaN)-on-silicon power field effect transistor, a junction field effect transistor (JFET), a MOS-controlled thyristor (MCT), or another silicon carbide (SiC)-based or GaN-based or other semiconductor material-based actively switchable power semiconductor device. However, the invention is not limited to wide bandgap devices, as conventional and other silicon (Si)-based switching devices such as insulated gate bipolar transistors (IGBTs) can be used. The source side of one solid-state switch 62 can be electrically connected to the source side of the other solid-state switch 63 to collectively provide a bi-directional switch. In this configuration, the wide bandgap power electronic switching device 70 can be used in soft starting applications, and also in bypass operations to help eliminate arcing when the mechanical switch 61 is opened. Further, each solid-state switch 62 or 63 can optionally comprise two or more such switches connected in parallel or in series, to increase the current or voltage handling capabilities of the circuit.

In the power electronic switching device 70, a first diode metal-oxide varistor (MOV) 72 can be connected in parallel across the first solid-state switch 62. A second diode 73 can be connected in parallel across the second solid-state switch 63. In the illustration, the drain side of each solid-state switch 62, 63 is connected to one side of its corresponding MOV 72, 73; and the source side of each switch 62, 63 is connected to the other side of its corresponding MOV 72, 73. MOVs are shown by way of example in this diagram, but alternative circuit protecting components such as an R-C snubber circuit in series with a Zener diode can be used in place of each MOV. As previously stated, each solid-state switch 62 or 63 can optionally comprise two or more such switches connected in parallel or in series, and it will be appreciated that the corresponding MOVs 72, 73 can also be increased in number as desired to increase the current or voltage handling capabilities of the circuit.

Figure 3:
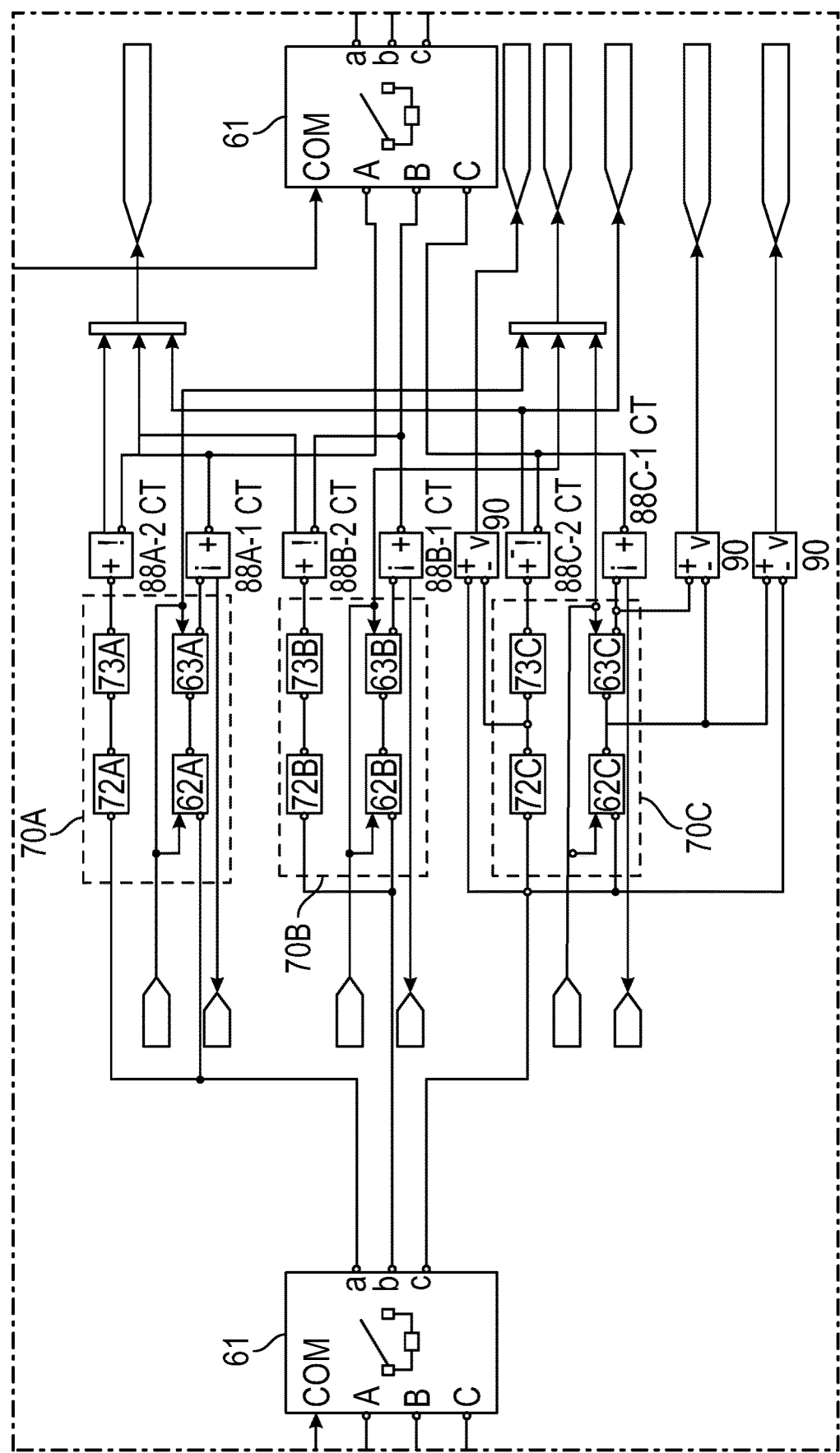
FIG. 3 illustrates an example circuit topology for a soft starting arrangement, in accordance with exemplary embodiments of the disclosed concept.

FIG. 3 illustrates an example topology for a soft starting arrangement using power electronic switching devices 70A-70C, each of which is connected to a phase of a mechanical switch 61 (shown twice in FIG. 3 for ease of illustration). Each of the power electronic switching devices 70A-70C includes two or more solid-state switches 62A/63A, 62B/63B or 62C/63C as well as two or more MOVs or other circuit protectors 72A/73A, 72B/73B or 72C/72C, in each case as described in more detail above in the discussion of FIGS. 2A-2B.

Referring collectively to FIGS. 1-3, when the AC electric motor 40 is off, the solid-state switches 62, 63 of each power electronic switching device 53 will be OFF, resulting in an open circuit. During start-up/ramp-up of motor 40, the soft starter 10 operates in a start-up or "ramping-up" mode, during which the system's controller 86 modulates current through the solid-state switches 62, 63 by turning the solid-state switches 62, 63 ON and OFF according to a control algorithm that will be described below, thus controlling the current flow (and therefore the voltage) applied to the AC electric motor 40. Then, in embodiments having only solid-state switches, after start-up the solid-state switches 62, 63 remain ON to keep the circuit closed for motor operation. In systems with hybrid switching devices, subsequent to start-up of AC electric motor 40, the soft starter 10 enters a "normal" mode in which controller 86 causes the mechanical switch device 61 of each phase to close, and in which the solid-state switches 62, 63 can either remain ON in a short circuit condition or turn OFF and be bypassed by the mechanical switch's circuit.

Operation of soft starter 10 requires that the system monitor current and voltage in each phase. The controller 86 acquires current measurements for each phase from a set of current sensors. In the illustrated embodiment of FIG. 1, the set of current sensors 88 includes current sensors 88A and 88B in two of the three phases. In this case, the system can use the two phase measurements to calculate current in the third phase. Alternative embodiments can include one or more respective current sensors for each of the three phases, as shown in the embodiment FIG. 3, in which each phase includes two current sensors 88A-1/88A-2, 88B-1/88B-2 and 88C-1/88C-2. In such a case, the system can individually measure current in all three phases, or if one current sensor fails it can measure current in two phases and use that data to calculate current in the third phase. Alternatively, two current sensors can be installed on any two of the three phases to measure two phase currents, in which case the controller 86 can calculate current in the third phase using the two measurements and other system parameters. Soft starter 10 is also equipped with one or more voltage sensors 90 that measure the voltage across the switching devices. While only one voltage sensor 90 is illustrated in FIG. 1, and three voltage sensors 90 are illustrated in FIG. 3 (all on a single phase) by way of example, various embodiments can include individual sets of one or more voltage sensors per phase. Alternatively, voltage sensors can be placed on any two of the three phases to measure two phase-to-ground/neutral voltages, or any two of the three phase-to-phase voltages (in which case the controller 86 can calculate the third phase-to-ground/neutral or phase-to-phase voltage. An optional temperature sensing unit 92 that includes one or more temperature sensors, can also be provided to monitor the temperature of soft starter 10. Together, the current sensors, voltage sensor(s), and/or temperature sensing unit (if used) form a sensor system 94 that provides feedback to controller 86.

Figure 4:
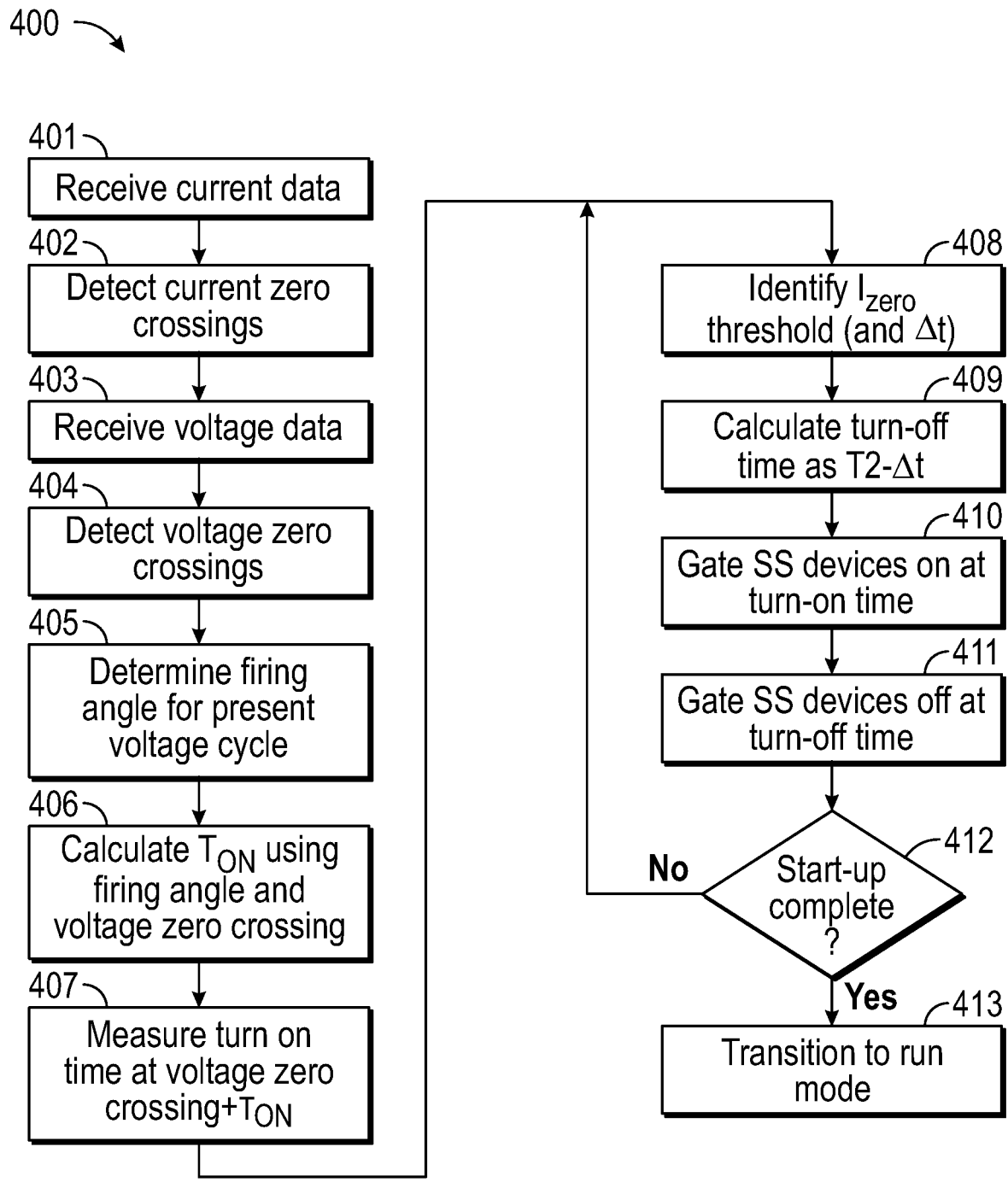
FIG. 4 is a flow diagram illustrating a soft starting process, in accordance with exemplary embodiments of the disclosed concept.
Figure 5:
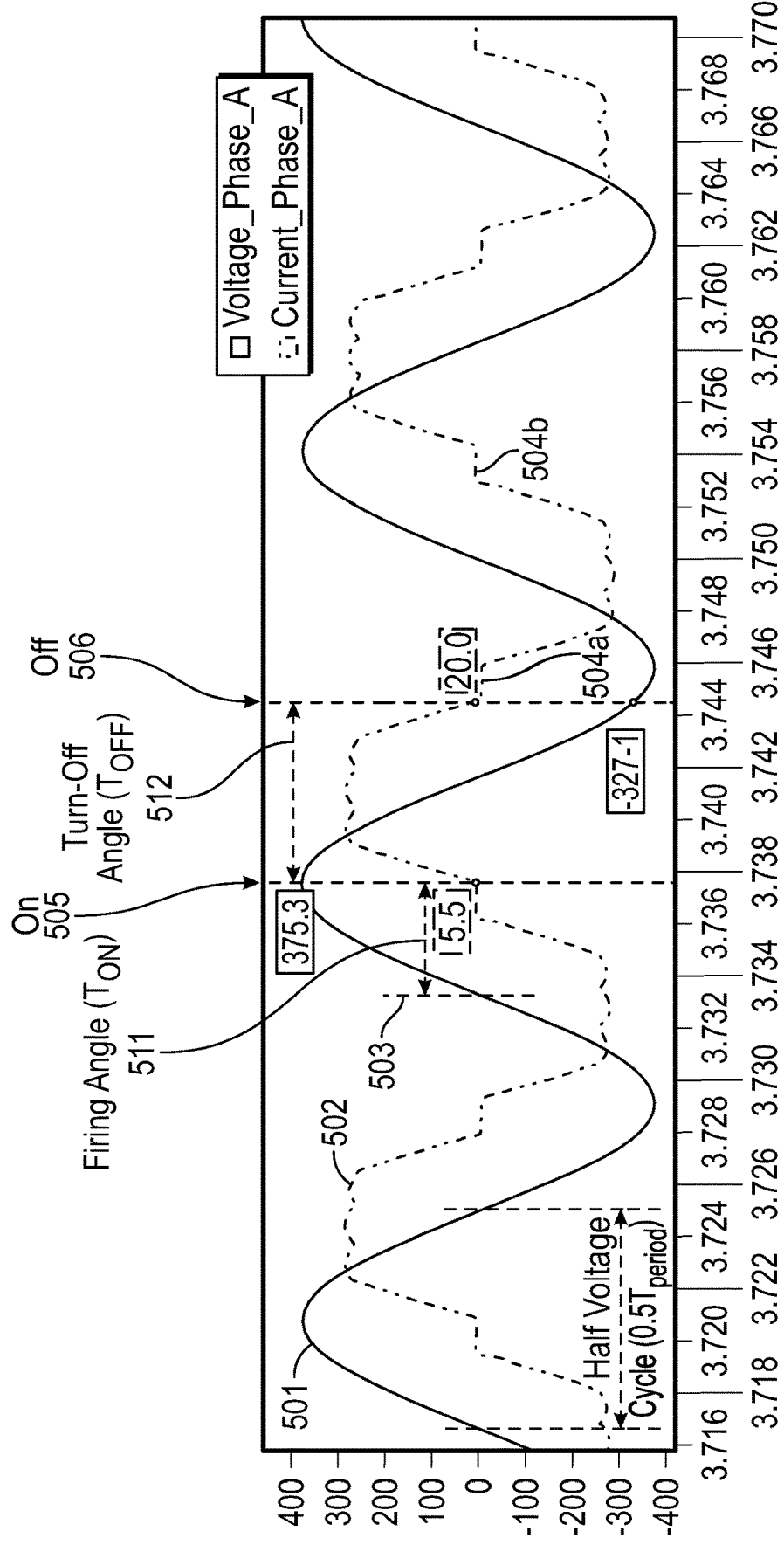
FIG. 5 illustrates voltage and current waveforms that depict an example soft starting process following the flow of FIG. 4.

FIGS. 4 and 5 illustrate a method 400 by which the system's controller 86 will cycle the solid-state switching devices on and off to limit the inrush of current to an AC electric motor during a start-up operation. FIG. 4 is a process flow diagram, while FIG. 5 provides a visual illustration of the method. In this method, for each phase of the system the controller 86 will command that phase's solid-state switching devices to gate ON according to timing that the system will determine based on the detected voltage zero-crossing and the phase angle reference for that phase. In addition, the controller 86 will command each phase's solid-state switching devices to gate OFF according to timing that the system will determine based on the detected current zero-crossing and the threshold of the current zero-crossing detection tolerance for that phase.

Referring to FIGS. 4 and 5, as noted above, once the system's solid-state switching devices are turned ON, the system's controller 86 will determine the current and voltage at 401 and 403 for each phase from data received from the system's current and voltage sensors. The voltage can be represented as a voltage waveform 501, while the current can be represented as current waveform 502. At 402 the system will detect current zero-crossings (represented by way of example as 504a and 504b in FIG. 5), and at 404 the system will detect voltage zero-crossings (represented by way of example as 503 in FIG. 5).

Figure 6:
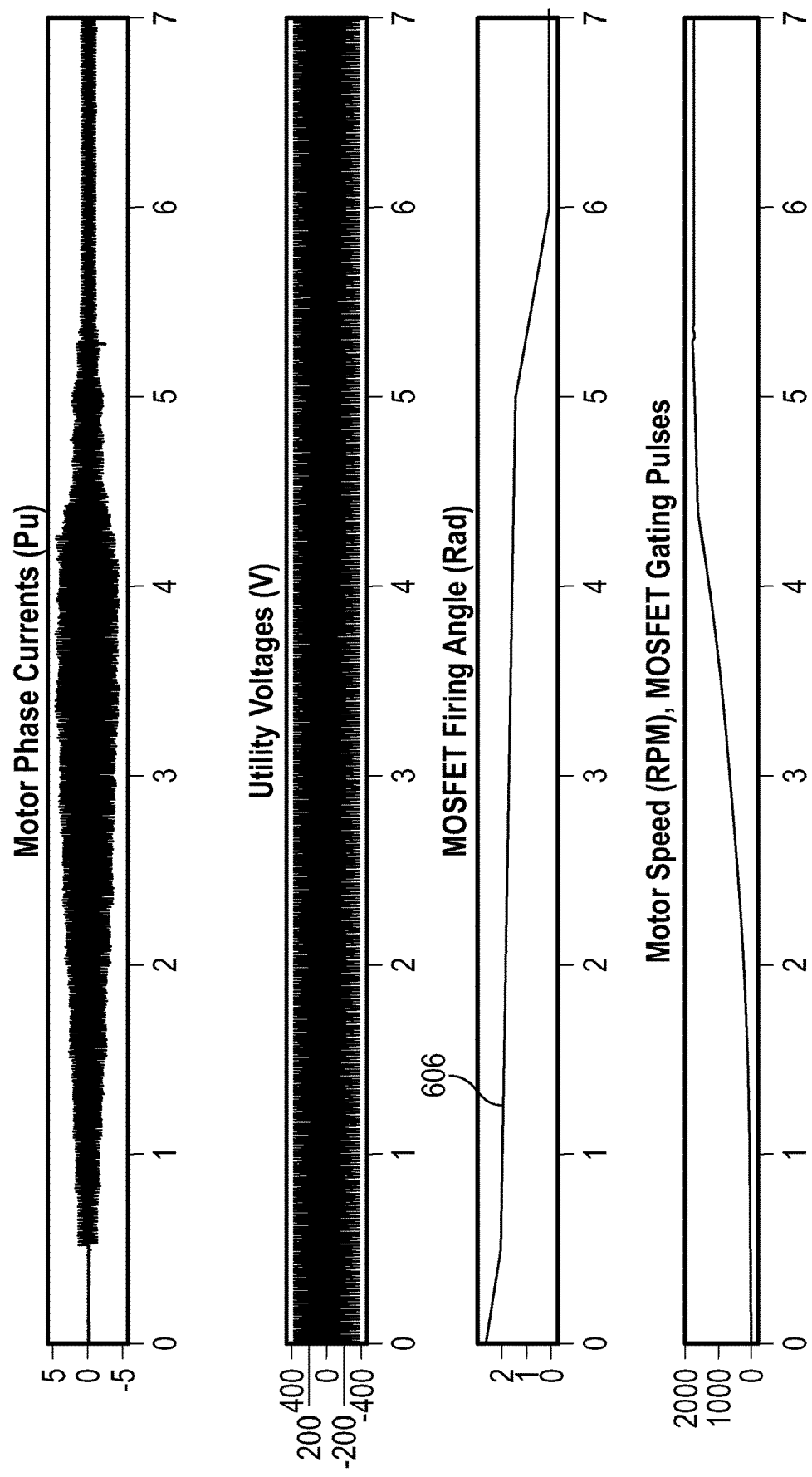
FIG. 6 illustrates an example of a motor profile data set from which a controller can acquire various parameters to be used in the soft starting process depicted in FIG. 4, in accordance with an exemplary embodiment of the disclosed concept.

At 405 the system will determine a firing angle for the present voltage cycle. The system can determine the firing angle using any suitable process, such as accessing a motor profile data set that is available for the motor that is being started. Such a data set will map firing angle values to points in time during motor start-up. The firing angle map can be determined during calibration or testing, or received from the soft starter manufacturer, motor supplier or another entity prior to placing the motor in service. An example map of firing angle data 606 over time is shown in FIG. 6.

Returning to FIGS. 4 and 5, at 406 the controller 86 will calculate a turn-on time $T_{ON}$ 511, which is an amount of time 511 after the next voltage zero crossing 503 at which the controller 86 will gate the solid-state switches ON (which is illustrated as time 505 in FIG. 5). At 407, the controller 86 measures the time 505. The system can calculate the turn-on time $T_{ON}$ 511 using an equation such as:

$$T_{ON} = \frac{\text{(firing angle value)}}{2\pi} \times \text{(period of phase voltage } T_{period}\text{)}$$

In the equation above, $2\pi$ represents the angle of one voltage cycle. $T_{period}$ can be a measured number as measured by the system's voltage sensors, or it can be calculated using a formula such as $T_{period} \approx 2*T_1$, in which $T_1$ is the measured distance between two adjacent voltage zero-crossings.

Figure 7:
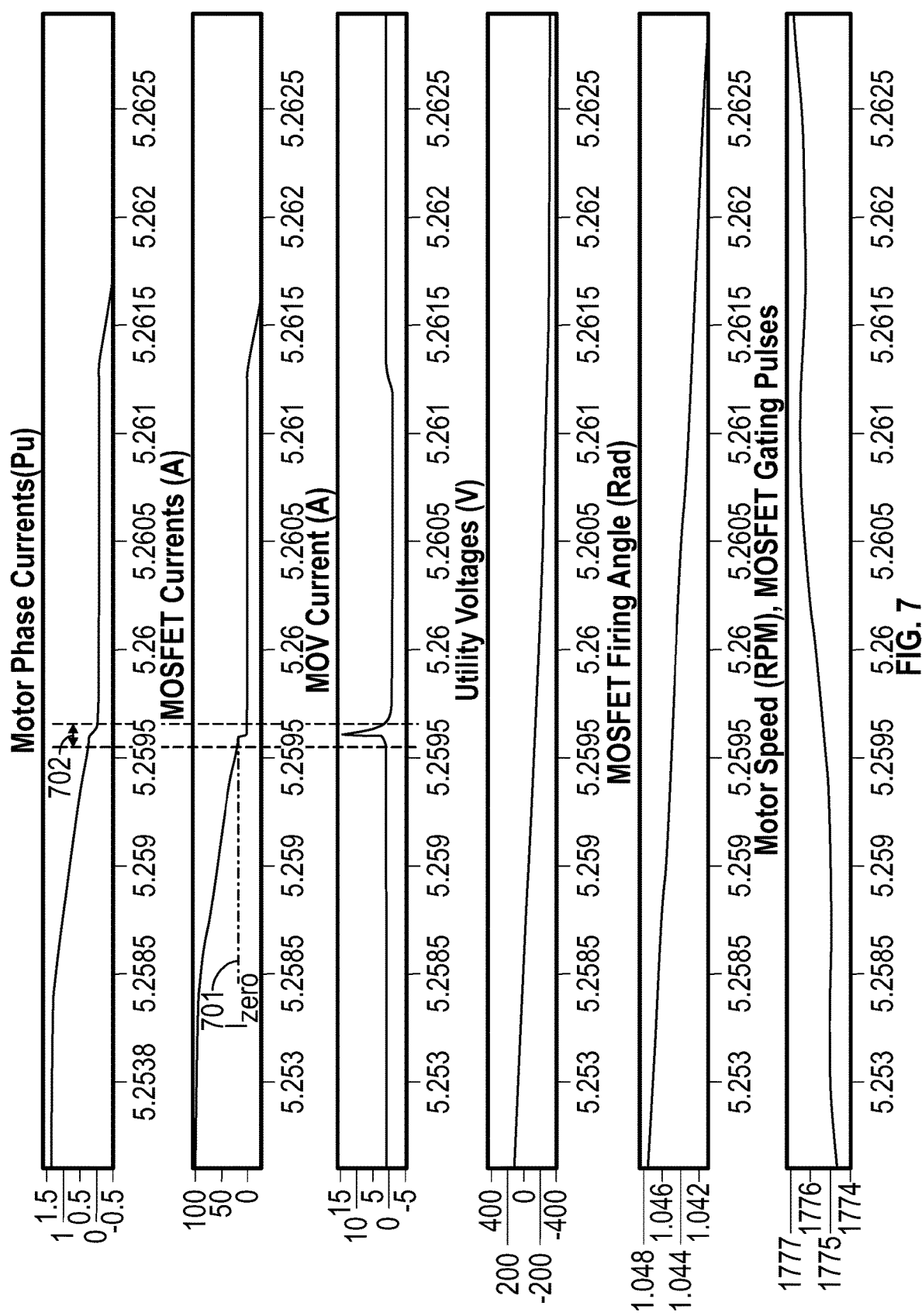
FIG. 7 illustrates another example of a motor profile data set from which a controller can acquire various parameters to be used in the soft starting process depicted in FIG. 4, in accordance with another exemplary embodiment of the disclosed concept.

After the current is turned on, at 408 the system will identify a current zero-crossing detection tolerance threshold $I_{ZERO}$, and optionally also a time amount $\Delta t$ representing an estimated amount of time that it will take for the current flowing through the solid-state devices to decrease from $I_{ZERO}$ to zero. As shown in FIG. 7, both the current zero-crossing detection tolerance threshold $I_{ZERO}$ 701 and the time amount $\Delta t$ 702 can be stored in the motor profile data in a memory of the controller 86, or in a memory that is accessible to the controller 86, as in a motor profile data set for the motor that is being started. Depending on the rating of the motor and the voltage level used, in a low voltage application $I_{ZERO}$ 701 can be (in each case approximately) 5 amps, 10 amps, 20 amps or 30 amps, or another level that is in a range from approximately 5 to approximately 30 amps, or another suitable level for the motor. $\Delta T$ 702 can be determined during calibration or testing, or received from the supplier of the motor or motor starter prior to placing the motor in service.

Returning to FIGS. 4 and 5, at 409 the system will determine $T_{OFF}$ as the time at which the current level reaches the current zero-crossing detection tolerance threshold $I_{ZERO}$. To do this, the system can determine the actual current level using measurements from current sensors, or by time-based calculation such as $T_{OFF} = T_2 - \Delta T$, in which $T_2$ is the time to the next anticipated current zero-crossing in either the negative direction of the waveform (as illustrated in FIG. 5 as 512) or in the positive direction of the waveform.

After determination of the turn-on time for each cycle, the controller 86 will send commands to the solid-state devices to gate ON at the turn-on time 505 (step 410), and the controller 86 will send gate OFF commands to the solid-state devices at the turn-off time 506 (step 411).

After completion of each voltage and current waveform cycle, the system will determine whether startup is complete at 412. The system can determine whether start-up is complete using any suitable method. For example, the system can be programmed to implement a start-up operation for a period of time that is defined in the motor's profile and/or varied based on motor load conditions, and it can determine that start-up is complete by determining that the time period has ended. Alternatively, the system can measure voltages and/or currents in the system and determine that start-up is complete when system voltages and/or currents have reached a threshold levels or other criteria as defined in the motor profile. Alternatively, the system can measure one or more aspects of the motor's operation, such as phase currents and/or motor rotor speed, and it can determine that start-up is complete when the measured aspects reach one or more target levels. The system can use other factors, or combinations of these and other factors, to determine completion in various embodiments.

If start-up is not complete (412:NO) the system will continue to determine firing angles and cycle the solid-state devices on and off as described in steps 408-411, with the firing angle varying over time according to the firing angle map. If start-up is complete, then at 413 the controller 86 will cause each soft starting switch 53 to transition from a start-up mode to a run mode. If the soft starting switch 53 is a hybrid switch, then to transition to the run mode at 413 the actuator of the mechanical switch will close the mechanical switch. This creates a conductive path from the power source to the motor that bypasses the solid-state switching devices. After a time that is sufficient for the mechanical switch to close, the controller 86 can leave the solid-state devices ON in a short circuit condition, or optionally the controller 86 can gate the solid-state devices OFF to complete the bypass operation. If the soft starting switch 53 is a purely solid-state device and not a hybrid switch, then to transition to the run mode at 413 the controller 86 can leave the solid-state devices ON to keep the circuit closed and allow the motor to run.

In addition to soft-starting, one familiar with the relevant field will appreciate that in certain applications the flow diagram described with respect to FIG. 4 can be slightly modified to provide a controlled stop of an electric machine and attached load. In one non-limiting example, various firing maps, both linear and non-linear, can be used to effectively prevent effects from letting the motor coast to stop in pumping applications.

While embodiments of the disclosed soft starter have been described herein with respect to soft starting an AC electrical motor, it should be noted that the disclosed soft starter can also be used to handle loads other than electric machines without departing from the scope of the disclosed concept.

While specific embodiments of the invention have been described in detail, it will be appreciated by those skilled in the art that various modifications and alternatives to those details could be developed in light of the overall teachings of the disclosure. The features and functions described above, as well as alternatives, may be combined into many other different systems or applications. Various alternatives, modifications, variations or improvements may be made by those skilled in the art, each of which is also intended to be encompassed by the disclosed embodiments. Accordingly, the particular arrangements disclosed are meant to be illustrative only and not limiting as to the scope of disclosed concept which is to be given the full breadth of the claims appended and any and all equivalents thereof.

What is claimed is:

1. A method of soft starting a motor, the method comprising:
providing a soft starting switch that is electrically connected between a power source and an alternating current (AC) motor, wherein:
the soft starting switch comprises one or more phases, each of which comprises:
a power electronic switching device that comprises a plurality of solid-state switches electrically connected in series or in parallel with each other; and
by a controller, cycling the solid-state switches ON and OFF during a start-up operation to regulate currents and voltages delivered to the AC motor during the start-up operation,
wherein cycling the solid-state switches ON and OFF during the start-up operation comprises, by the controller:
receiving current data from one or more current sensors, and detecting a plurality of Current zero crossings in the current data over a plurality of current cycles;
receiving voltage data from one or more sensors, and detecting a plurality of current zero crossings in the voltage data over a plurality of voltage cycles; and
for each phase:
determining a firing angle for a present voltage cycle,
using the detected voltage zero-crossings and the firing angle for the present voltage cycle to determine a time to command that phase's solid-state switches to gate ON, and
using the detected current zero-crossings info and a current zero-crossing detection tolerance threshold to determine a time to command that phase's solid-state switches to gate OFF.

2. The method of claim 1 further comprising, by the controller in each phase upon completion of the start-up operation, transitioning the soft starting switch from the start-up operation to a run mode by commanding the solid-state switches to remain ON.

3. The method of claim 1, wherein the soft starting switch further comprises a mechanical switch that is electrically connected in parallel with the power electronic switching device.

4. The method of claim 3 further comprising, by the controller in each phase upon completion of the start-up operation, transitioning the soft starting switch from the start-up operation to a run mode by:
causing an actuator to close the mechanical switch; and either:
commanding the solid-state switches to remain ON to create a short circuit condition, or
commanding the solid-state switches to turn OFF and remain OFF to create a bypass condition.

5. The method of claim 1, wherein determining the firing angle comprises accessing motor profile data for the motor and identifying, from the motor profile, a firing angle that corresponds to a present time in the start-up operation.

6. A system for soft starting a motor, the system comprising:
a soft starting switch comprising:
a line side for connecting to a power source and a load side for connecting to a motor, and
a power electronic switching device that is positioned between the line side and the load side, and that comprises a plurality of solid-state switches electrically connected in series or in parallel with each other;
a controller configured to regulate currents and voltages delivered to the motor during a start-up operation of the motor by cycling the solid-state switches ON and OFF during the start-up operation;
one or more current sensors;
one or more voltage sensors; and
programming instructions that are configured to cause the controller to:
receive current data from the one or more current sensors,
detect a plurality of current zero crossings in the current data over a plurality of current cycles,
receive voltage data from the one or more voltage sensors,
defect a plurality of voltage zero crossings in the voltage data over a plurality of voltage cycles, and
for each phase:
determine a firing angle for a present voltage cycle;
use the detected voltage zero-crossings and the firing angle for the present voltage cycle to determine a time to command that phase's solid-state switches to gate ON; and
use the detected current zero-crossings information and a current zero-crossing detection tolerance threshold to determine times to command that phase's solid-state switches to gate OFF.

7. The system of claim 6, wherein each of the plurality of solid-state switches comprises:
a metal oxide field effect transistor (MOSFET);
a gallium nitride (GaN)-on-silicon power field effect transistor;
a junction field effect transistor (JFET);
a MOS-controlled thyristor (MCT); or
another silicon carbide (SiC)-based or GaN-based or other semiconductor material-based actively switchable power semiconductor device.

8. The system of claim 6, wherein each of the plurality of solid-state switches comprises an insulated gate bipolar transistor (IGBT) or another silicon (Si)-based switching device.

9. The system of claim 6, wherein the soft starting switch further comprises a mechanical switch that is electrically connected in parallel with the power electronic switching device.

10. The system of claim 6, wherein the controller comprises a memory containing motor profile data for the motor, and wherein the motor profile comprises:
firing angle data that maps firing angle values for the motor to points in time over the start-up operation; and
the current zero-crossing detection tolerance threshold.

11. The system of claim 10, wherein the power electronic switching device further comprises a plurality of varistors, each of which is electrically connected in parallel across one or more of the solid state switches.

* * * * *